(12) United States Patent
Tolley

(10) Patent No.: US 11,952,847 B2
(45) Date of Patent: Apr. 9, 2024

(54) COUPLING MECHANISM

(71) Applicant: ACOUSTIC DATA LIMITED, Eden Island (SC)

(72) Inventor: Mark Tolley, Eden Island (SC)

(73) Assignee: ACOUSTIC DATA LIMITED, Eden Island (SC)

( * ) Notice: Subject to any disclaimer, the term of this patent is extended or adjusted under 35 U.S.C. 154(b) by 107 days.

(21) Appl. No.: 17/636,415

(22) PCT Filed: Sep. 10, 2020

(86) PCT No.: PCT/IB2020/058402
§ 371 (c)(1),
(2) Date: Feb. 18, 2022

(87) PCT Pub. No.: WO2021/048774
PCT Pub. Date: Mar. 18, 2021

(65) Prior Publication Data
US 2022/0298877 A1   Sep. 22, 2022

(30) Foreign Application Priority Data
Sep. 13, 2019   (GB) ..................... 1913245

(51) Int. Cl.
*E21B 23/01* (2006.01)
*E21B 23/02* (2006.01)
(Continued)

(52) U.S. Cl.
CPC .............. *E21B 23/01* (2013.01); *E21B 23/02* (2013.01); *E21B 47/16* (2013.01); *E21B 33/1291* (2013.01)

(58) Field of Classification Search
CPC .......... E21B 23/01; E21B 23/02; E21B 47/16; E21B 33/1291; E21B 47/14
See application file for complete search history.

(56) References Cited

U.S. PATENT DOCUMENTS

| 4,944,345 A | 7/1990 | Mashaw, Jr. |
| 2017/0335679 A1 | 11/2017 | Tubel et al. |

(Continued)

FOREIGN PATENT DOCUMENTS

| GB | 2056573 A | 3/1981 |
| WO | 2015042698 A1 | 4/2015 |

(Continued)

OTHER PUBLICATIONS

Corresponding International Patent Application No. PCT/IB2020/058402, International Search Report dated Nov. 18, 2020.

(Continued)

*Primary Examiner* — Caroline N Butcher
(74) *Attorney, Agent, or Firm* — Cooper Legal Group, LLC

(57) ABSTRACT

A coupling mechanism is disclosed for coupling a wireless communication device to a locating profile in a wellbore. The coupling mechanism comprises a coupling body arranged for connection to the wireless communication device, and an anchoring unit. The coupling body includes a conical portion with a tapered outer surface. The anchoring unit has a tapered inner surface arranged to oppose the tapered outer surface of the coupling body. The coupling body and the anchoring unit are configured for relative movement to cause the anchoring unit to expand radially to grip the locating profile.

20 Claims, 6 Drawing Sheets

(51) Int. Cl.
    *E21B 33/129* (2006.01)
    *E21B 47/16* (2006.01)

(56) References Cited

U.S. PATENT DOCUMENTS

| | | | |
|---|---|---|---|
| 2018/0038221 A1 | 2/2018 | Hughes et al. | |
| 2018/0298717 A1* | 10/2018 | Costa De Oliveira | ................... E21B 33/12955 |
| 2019/0249548 A1* | 8/2019 | Zhang | ............... H04L 67/12 |
| 2019/0352998 A1* | 11/2019 | Wolf | ............... E21B 33/128 |

FOREIGN PATENT DOCUMENTS

| | | |
|---|---|---|
| WO | 2015155617 A1 | 10/2015 |
| WO | 2016060658 A1 | 4/2016 |
| WO | 2016200266 A1 | 12/2016 |

OTHER PUBLICATIONS

Corresponding International Patent Application No. PCT/IB2020/058402, Written Opinion dated Nov. 18, 2020.
Corresponding Great Britain Patent Application No. GB1913245.5, Great Britain Search Report dated Feb. 21, 2020.
Acoustic Data: "SonicGuage(TM) Wireless Monitoring System", YouTube, Jun. 27, 2018, URL:https://www.youtube.com/watch?v=Rz4BG17Gz_k.

* cited by examiner

COUPLING MECHANISM

The present invention relates to a coupling mechanism for coupling a wireless communication device, such as an acoustic communication device, to a locating profile in a wellbore. The present invention has particular, but not exclusive, application in coupling an acoustic source and associated measurement equipment in a side pocket mandrel of a wellbore.

In the field of hydrocarbon production it is known to use acoustic telemetry to transmit real-time data to the surface in order to monitor oil and gas well and reservoir performance. For example, WO 2015/155617, the subject matter of which is incorporated herein by reference, discloses a gauge hanger which is used to support an acoustic telemetry device that is designed to measure wellbore pressure in real-time. The measurements are converted into encoded acoustic wave data and sent to surface as a vibration inside the steel wall of the wellbore tubing. These acoustic waves are detected by an accelerometer that is bolted to the wellhead. In this way, the device can provide real-time data about wellbore pressure during production.

During oil well construction it is sometimes necessary to install wide points, known as side pocket mandrels, in the production tubing. These provide a place to install equipment within the tubing but off to one side so as not to obstruct the main bore. Two typical uses are to install measurement instrument or to install a valve connecting the outside to the inside of the tubing. The measurement instrument might be wired to surface or it might have a memory that can be downloaded when it is subsequently retrieved. Typically, the measurement instrument would be installed and retrieved with a cable deployed tool.

US 2017/0335679, the subject matter of which is incorporated herein by reference, discloses a system including a power generator and a wireless communications transmitter which can be deployed in a side pocket mandrel. An acoustic generator may be used to provide acoustic energy as digital bits that travel to the surface using fluid, production tubing or the like.

A problem in the arrangement disclosed in US 2017/0335679 is that the setting and retrieving of such a system in the side pocket mandrel is complex due to the constraints of borehole geometry and the mechanical coupling requirements of acoustic transmission. In particular, the acoustic source must be properly acoustically coupled to the tubing in order for acoustic communication to be effective. This may limit or prevent the setting and then subsequent retrieval of the system in an existing side pocket mandrel.

It would therefore be desirable to provide a mechanism for installing and/or retrieving an acoustic instrument in a side pocket mandrel or similar locating profile, and allowing it to communicate effectively.

According to a first aspect of the present invention there is provided a coupling mechanism for coupling a wireless communication device to a locating profile in a wellbore, the coupling mechanism comprising:
- a coupling body arranged for connection to the wireless communication device, the coupling body comprising a tapered outer surface; and
- an anchoring unit comprising a tapered inner surface arranged to oppose the tapered outer surface of the coupling body, wherein the coupling body and the anchoring unit are configured for relative movement to cause the anchoring unit to expand radially to grip the locating profile.

The present invention may provide the advantage that the coupling mechanism can be used to set the communication device in a location which may be constrained by wellbore geometry, such as a side pocket mandrel. For example, in the case where the communication device is an acoustic communication device, the coupling mechanism can be used to set the acoustic communication device and to acoustically couple the acoustic communication device to the wellbore.

The coupling body and the anchoring unit may be arranged such that relative movement between the two is in an axial direction. For example, the coupling mechanism may further comprise a shaft, and at least one of the coupling body and the anchoring unit may be arranged to slide axially along the shaft. This may help to ensure that relative movement between the coupling body and the anchoring unit is in the required direction.

Preferably, the relative movement between the coupling body and the anchoring unit is such that the coupling body moves inside the anchoring unit. This may facilitate expansion of the anchoring unit and biasing of the anchoring unit against the locating profile.

The tapered outer surface of the coupling body may be provided at one end of the coupling body. In this case, the other end of the coupling body may be arranged to connect to the communication device. For example, the coupling body may comprise a screw thread or any other appropriate connecting means for connecting the coupling body to the communication device.

Preferably the tapered outer surface of the coupling body is substantially frustoconical. The tapered inner surface of the anchoring unit may also be substantially frustoconical. This can allow the two surfaces to oppose each other in such as way as to allow radially expansion of the anchoring unit as the coupling body moves inside the anchoring unit. This may facilitate expansion of the anchoring unit and help to ensure that the anchoring unit is biased against the locating profile. However, the tapered surfaces do not need to be frustoconical, and could for example be flat or curved in some other way.

The anchoring unit may comprise a plurality of anchor slips each of which may have a tapered inner surface. For example, each anchor slip may have a partially frustoconical inner surface and/or a partially cylindrical outer surface. The anchoring slips may be arranged circumferentially around the tapered part of the coupling body and/or a shaft. This may provide a convenient mechanism by which the anchoring unit can be expanded radially. In one embodiment, three anchor slips are provided, although any other appropriate number, such as two, four or more, could be used.

The anchoring unit preferably comprises means for elastically retaining the anchor slips. The retaining means may be, for example, a snap ring or any other suitable elastic or other energy storage device. The retaining means may be arranged to expand to allow expansion of the anchoring unit in the locating profile. Furthermore, the retaining means may be arranged to apply a contracting force to the expanded anchoring unit. This can allow the anchoring unit to expand as the coupling body enters, and then subsequently to contract as the anchoring unit retracts. Thus, this arrangement may facilitate the setting and then subsequent removal of the coupling mechanism.

The coupling mechanism is preferably arranged to prevent relative movement between the coupling body and the anchoring unit as it is lowered into the wellbore. To help achieve this, the coupling mechanism may further comprise means for connecting the anchoring unit to the coupling body. The connecting means may be arranged to prevent relative movement between the anchoring unit and the coupling body as the coupling mechanism is lowered in the wellbore. Preferably, the connecting means is arranged to disengage when the coupling mechanism lands in the locating profile, for example, upon application of a predetermined force. This may help to ensure that the anchoring unit only expands when it is in the locating profile.

The connecting means may comprise, for example, a shear pin or similar weak point, which may be arranged to shear upon the application of a predetermined force. In this case, the coupling mechanism may be arranged to shear the shear pin as it lands in the locating profile. This may be achieved, for example, by force of gravity and/or a wireline jar such as a slide hammer which may be connected to the coupling mechanism.

The coupling mechanism may further comprise means for biasing the anchoring unit against the locating profile. The biasing means may be arranged to bias the anchoring unit against the locating profile so as to allow acoustic energy to be transmitted between the communication device and the wellbore through the coupling body and the anchoring unit.

In a preferred embodiment the biasing means comprises a spring. The coupling mechanism may be arranged to hold the spring in compression or tension as it is lowered in the wellbore. In this case, the coupling mechanism may be arranged to release the spring when the coupling mechanism lands in the locating profile. This can allow the spring to store mechanical energy as it is being lowered, and then release mechanical energy when the coupling mechanism lands in the locating profile. This may facilitate expansion of the anchoring unit and help to ensure that the anchoring unit is firmly biased against the locating profile. However, any other appropriate biasing means which is capable of storing mechanical energy may be used instead of a spring. Alternatively, a hammer action and/or gravity on the tapered surfaces may be sufficient to bias the anchoring unit against the locating profile.

Where the coupling mechanism comprises means for connecting the anchoring unit to the coupling body, the connecting means may be arranged to prevent relative movement between the anchoring unit and the coupling body and to hold the spring in compression or tension as the coupling mechanism is lowered in the wellbore. In this case, the connecting means may be arranged to disengage the anchoring unit from the coupling body and to release the spring when the coupling mechanism lands in the locating profile. This may help to reduce complexity of the coupling mechanism by allowing a single device, such as a shear pin, to release the spring as well as to disengage the anchoring unit from the coupling body, thereby allowing the anchoring unit to expand into the locating profile.

Where the coupling mechanism comprises a shaft, the spring may be located on the shaft. This may help to hold the spring in place and allow it to apply a biasing force against the anchoring unit. The spring may be, for example, a helical spring which may be held in compression on the shaft.

The coupling mechanism may further comprise a collar on the shaft between the spring and the anchoring unit. The collar may help to transfer mechanical energy from the spring to the anchoring unit.

The collar may comprise means for preventing reverse movement of the anchoring unit along the shaft. For example, the collar may comprise an annular groove on its inner surface, which may be arranged to receive an elastic device such as a snap ring. A corresponding annular groove may be provided on the outer surface of the shaft. The collar and the shaft may be arranged such that, as the collar moves along the shaft, the elastic device moves into the groove in the shaft. This may help to prevent the anchoring unit from sliding back along the shaft once it has expanded. This in turn may help to ensure that the anchoring unit remains in place and/or facilitate removal of the coupling mechanism.

Preferably the coupling mechanism comprises retention means for retaining the coupling body inside the anchoring unit once the anchoring unit has expanded. This may help to ensure that the anchoring mechanism remains in place, with the anchoring unit biased against the locating profile.

In a preferred embodiment, the coupling mechanism is arranged such that, after setting in the locating profile, it can be subsequently removed. This may be achieved by arranging the retention means to be disengagable. This may allow the coupling body to withdraw from the anchoring unit, thereby allowing the anchoring unit to contract.

For example, the retention means may comprise a shear pin which may be arranged to shear upon the application of a predetermined force. Where the coupling mechanism comprises a first shear pin for connecting the anchoring unit to the coupling body, the retention means may comprise a second shear pin, and the second shear pin may require a greater shearing force than the first shear pin. This can allow the anchoring unit to be released in order to expand into the locating profile upon application of a first force when the coupling mechanism lands in the locating profile, and the coupling body to be withdrawn to allow contraction of the anchoring unit on application of a second, higher force. The second, higher force may be provided for example through a wireline connected to the coupling mechanism. Thus this arrangement can facilitate the setting and subsequent removal of the coupling mechanism in the locating profile.

In a preferred embodiment, the wireless communication device is an acoustic communication device, and is preferably arranged for acoustic communication through the wellbore. Alternatively or in addition the communication device could be an electromagnetic communication device or any other suitable type of wireless communication device.

The locating profile is preferably arranged such that it is able to receive the coupling mechanism, and to provide an area into which the anchoring unit can expand. Thus, the locating profile may comprise a first section with an inner radius sufficiently large to allow passage of the coupling mechanism in an unexpanded state but not in an expanded state, and a second section with an inner radius greater than that of the first section. The radius of the second section is preferably such that it can allow the anchoring unit to bear against it in the expanded state. This may facilitate secure anchoring of the coupling mechanism in the locating profile.

Preferably the coupling mechanism further comprises a third section with an inner radius less than that of the first section and/or the second section. This may provide a restriction against which the coupling mechanism can land as it is lowered into the wellbore. This in turn may allow the anchoring unit to be released so as to expand into the locating profile, for example by severing a shear pin.

The locating profile may be in a side pocket mandrel, for example, in a production tubing, or it may be present in the main wellbore, or elsewhere.

According to another aspect of the invention there is provided an assembly comprising a coupling mechanism in any of the forms described above, and a wireless communication device. The wireless communication device may be an acoustic communication device. The acoustic communication device may be arranged for acoustic communication through the wellbore, via the coupling body and the anchoring unit. Any appropriate data and/or commands, such as pressure and/or temperature data, may be transmitted or received. The assembly may further comprise a measurement device for measuring one or more parameters to be transmitted.

Corresponding methods may also be provided. Thus, according to another aspect of the invention, there is provided a method of coupling a wireless communication device to a locating profile in a wellbore, the method comprising:

connecting the communication device to a coupling mechanism, the coupling mechanism comprising a coupling body and an anchoring unit, the coupling body comprising a tapered outer surface and the anchoring unit comprising a tapered inner surface arranged to oppose the tapered outer surface of the coupling body;

lowering the coupling mechanism and the communication device into the wellbore; and moving the coupling body relative to the anchoring unit to cause the anchoring unit to expand radially to grip the locating profile.

The wireless communication device may be an acoustic communication device. The method may further comprise biasing the anchoring unit against the locating profile, thereby allowing acoustic energy to be transmitted between the acoustic communication device and the wellbore through the coupling body and the anchoring unit.

Features of one aspect of the invention may be provided with any other aspect. Apparatus features may be provided with method aspects and vice versa.

Preferred embodiments of the present invention will now be described, purely by way of example, with reference to the accompanying drawings, in which.

Figure 1:
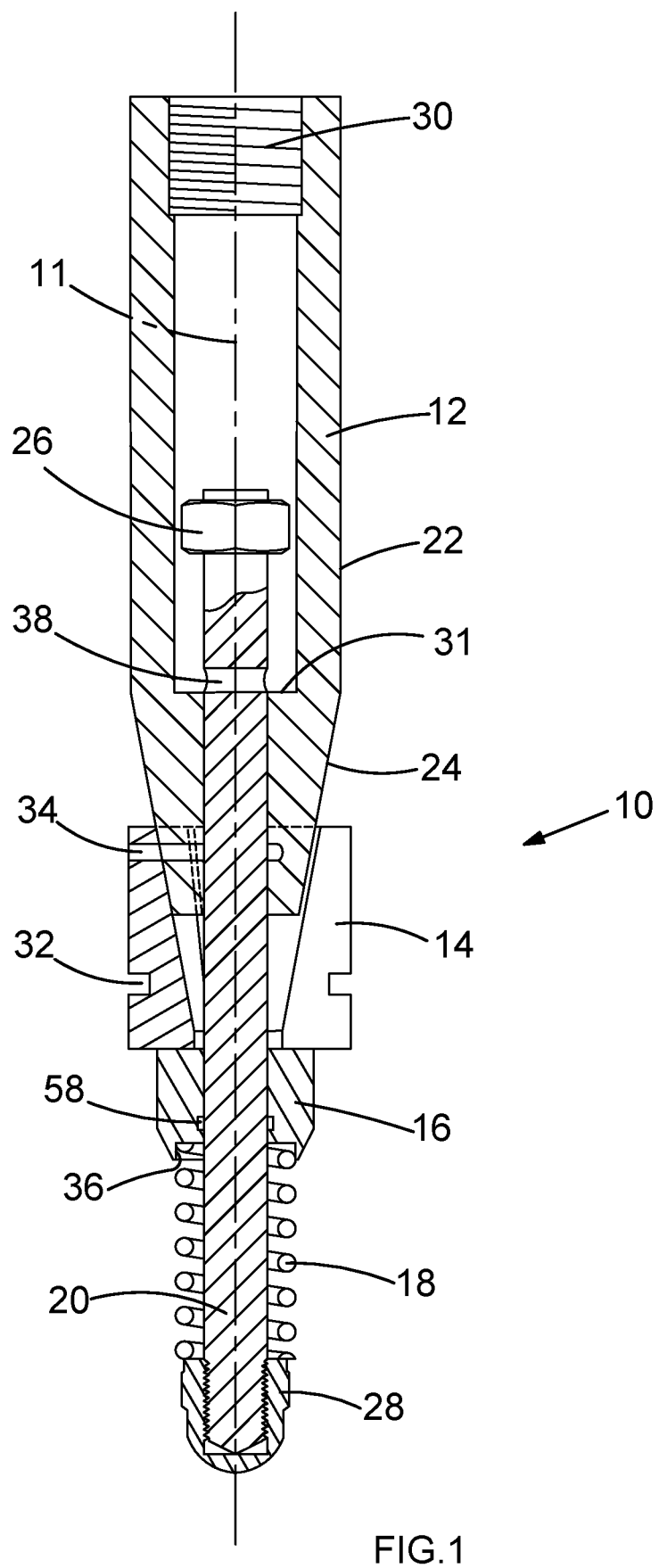
FIG. 1 is a radial cross section through parts of a coupling mechanism in an embodiment of the invention.

FIG. 1 is a radial cross section through parts of a coupling mechanism in an embodiment of the invention. Referring to FIG. 1, the coupling mechanism 10 comprises main body 12, anchoring unit 14, collar 16, spring 18 and shaft 20. The coupling mechanism 10 has a generally cylindrical outer profile, which allows it to be accommodated in a locating profile having a generally cylindrical internal surface. The coupling mechanism extends in an axial direction, with a longitudinal axis 11 running through its centre.

The main body 12 comprises a cylindrical portion 22 with a substantially cylindrical outer surface, and a conical portion 24 with a substantially frustoconical outer surface. The cylindrical portion 22 and conical portion 24 are both hollow, with cylindrical inner surfaces. The shaft 20 runs through the centre of the conical portion 24 and partially into the cylindrical portion 22.

The inner surface of the conical portion 24 has a radius which is sufficient to allow the main body 12 to slide along the shaft 20, while minimising any play between the two. The inner surface of the cylindrical portion 22 has a radius which is larger than that of the conical portion 24. The inner radius of the cylindrical portion 22 is sufficient to accommodate a nut 26 screwed onto an end of the shaft 20 and to allow axial movement thereof. A shoulder 31 at the interface of the cylindrical portion 22 and the conical portion 24 prevents entry of the nut 26 into the conical portion 24. The end of the cylindrical portion 22 away from the conical portion 24 has an internal thread 30 which is used to connect the main body 12 to an acoustic transceiver.

The anchoring unit 14 comprises a plurality of anchor slips spaced circumferentially around the shaft 20 and the end of the conical portion 24. Each of the anchor slips has a partially cylindrical outer surface, and a tapered (partially frustoconical) inner surface. The tapered inner surfaces oppose the frustoconical outer surface of the conical portion 24 of the main body 12. The anchoring unit 14 includes an annular groove 32 for a snap ring which is used to retain the anchor slips. A hole 34 passes through the anchoring unit 14 and into the conical portion 24 of the main body 12. The hole 34 is used to hold a shear pin. The shear pin, when in position, holds the main body 12 and the anchoring unit 14 together and prevents relative movement between the two.

The collar 16 is in the form of a hollow cylinder, with an inner surface sized to allow the collar to slide along the shaft 20, while minimising any play between the two. The collar 16 has a first end surface which abuts the anchoring unit 14, and a second end surface with a recess 36 which receives one end of the spring 18. The collar 16 also includes an annular groove 58 on its inner surface. This groove 58 is used to accommodate a second snap ring, as will be explained later.

The shaft 20 runs in an axial direction through the centre of the main body 12, anchoring unit 14, collar 16 and spring 18. The main body 12, anchoring unit 14, collar 16 and spring 18 are each arranged such that, in the appropriate circumstances, they are able to slide axially along the shaft 20. A cap 28 is securely fixed to the end of the shaft 20 and provides a shoulder against which the spring 18 can bear. The nut 26 is screwed onto the other end of the shaft, inside the main body 12. The shaft 20 also includes a hole 38 which can accommodate a second shear pin. The hole 38 is located inside the cylindrical portion 22 of the main body 12. The dimensions of the hole 38 are such that it is able to receive a shear pin requiring a greater shear force than that of the hole 34.

Figure 2:
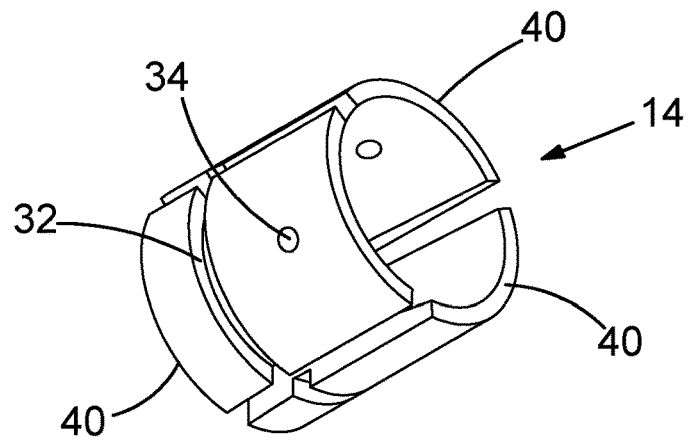
FIG. 2 shows parts of an anchoring unit in more detail.
Figure 3A:
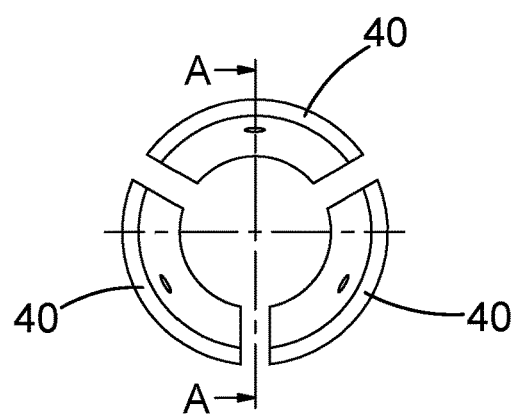
FIG. 3A shows an end view of the anchoring unit and FIG. 3B shows a radial cross section through the anchoring unit.
Figure 3B:
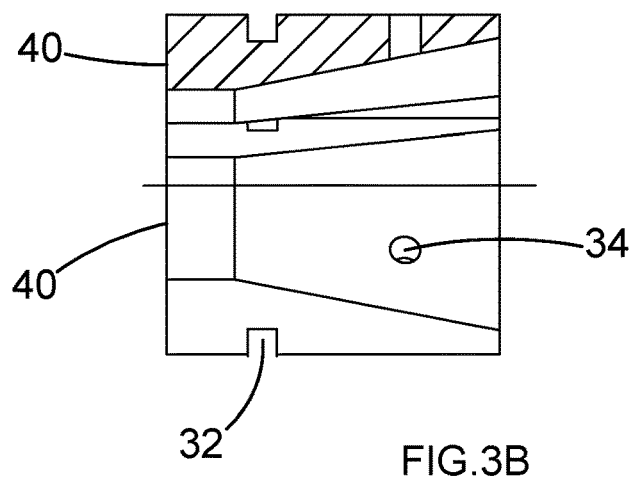

FIG. 2 shows parts of the anchoring unit 14 in more detail. In this embodiment, the anchoring unit comprises three anchor slips 40 spaced circumferentially around the shaft 20. Each of the anchor slips 40 has a partially cylindrical outer surface, and a tapered (partially frustoconical) inner surface. The direction of the taper opposes that of the outer surface of the conical portion 24 of the main body 12. The anchor slips 40 include grooves 32, which are used to locate a snap ring which holds the anchor slips together. One or more holes 34 are provided, which are used to locate a shear pin which holds the anchoring unit 14 and the main body 12 together. FIG. 3A shows an end view of the anchoring unit 14, and FIG. 3B shows a radial cross section through the anchoring unit.

The coupling mechanism is assembled as follows. First a shear ring is inserted in the hole 38 in the shaft 20, and the bolt 26 is screwed onto the end of the shaft. The shaft is then inserted into the main body 12 through the end with the screw thread 30. The shaft is passed through the centre of the main body 12 until the shear pin in the hole 38 comes into contact with the shoulder 31 between the cylindrical portion 22 and the conical portion 24, preventing further passage. The anchoring unit 14 is then assembled by placing anchor slips 40 around the shaft 20 and the end of the conical portion 24. The anchor slips are held in place with a slip ring in the groove 32. A shear pin is inserted in the hole 34 to prevent relative movement between the anchoring unit 14 and the main body 12. The collar 16 is then slid onto the shaft 20 to abut the end of the anchoring unit 14. The spring 18 is then inserted on the shaft 20. The spring is compressed, and the compressed spring in held in place with the cap 28. The cap 28 is fixed securely to the shaft 20, for example by screwing an internal thread in the cap onto an external thread on the shaft.

Figure 4:
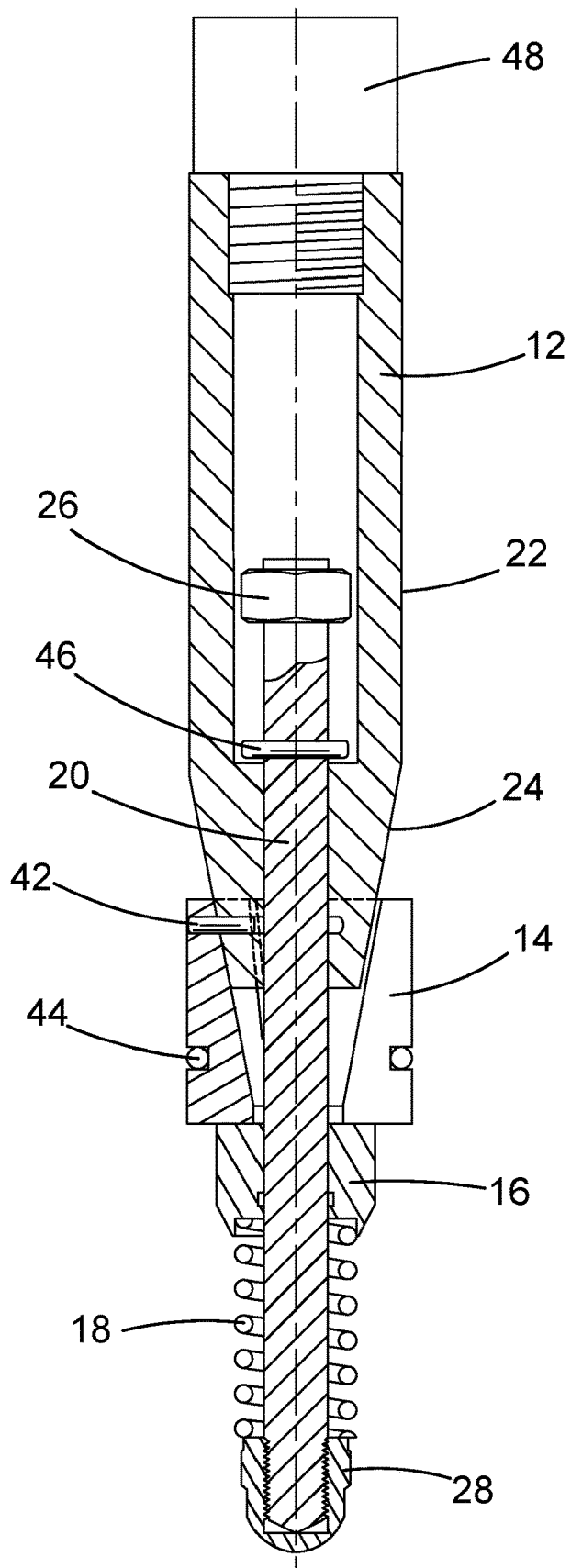
FIG. 4 shows the coupling mechanism in an assembled state.

FIG. 4 shows the coupling mechanism in the assembled state. The anchoring unit 14 and the main body 12 are held together by means of a shear pin 42 in the hole 34. The spring 18 is in compression and bears against the cap 28 at one end and the collar 16 at the other end. A snap ring 44 is located around the anchoring unit 14. The snap ring 44 holds the anchoring unit in an unexpanded state, with an outer radius substantially the same as that of the main body 12. A second shear pin 46 is located in the hole 38 in the shaft 20, inside the cylindrical portion 22 of the main body 12. The second shear pin 46 is sized to withstand a larger shearing force than the first shear pin 42.

The assembled coupling mechanism is connected to the bottom of an acoustic transceiver 48 and associated measuring instruments (not shown). This is achieved by screwing the acoustic transceiver 48 into the thread 30 in the main body 12. The entire assembly (coupling mechanism, acoustic transceiver and measuring instruments) is then lowered into the well on a mechanical cable (as known as a slickline or wireline). No electrical communication is needed.

As the assembly is lowered into the wellbore, it eventually reaches a locating profile in the wellbore. This locating profile may be in a side pocket mandrel in a production tubing, or it may be present in the main wellbore. If appropriate, means for pushing the assembly laterally into a side pocket mandrel may be provided, such means being known in the art.

Figure 5:
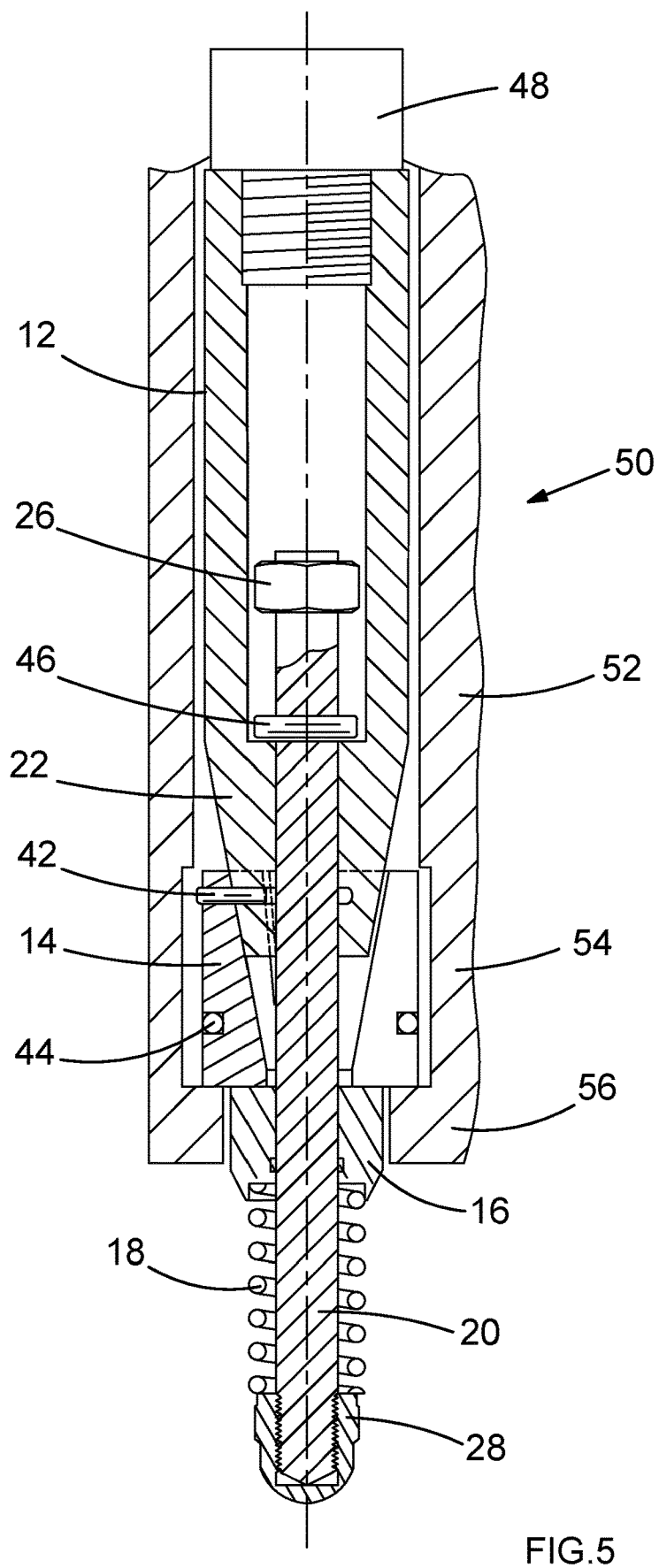
FIG. 5 shows the coupling mechanism as it lands in a locating profile.

FIG. 5 shows the coupling mechanism as it lands in the locating profile. The locating profile 50 is a female receiving profile with substantially cylindrical (or partially cylindrical) inner surfaces. The locating profile has three sections, each of which has an inner surface with a different radius. The top section 52 of the locating profile has an inner radius which is sufficient to allow passage of the coupling mechanism 10 in the unexpanded state shown in FIGS. 4 and 5 (but not in the expanded state). The middle section 54 of the locating profile has an inner radius which is slightly larger than that of the top section 52. The bottom section 56 of the locating profile has an inner radius which narrower than that of the other two sections. The inner radius of the bottom section 56 is such that it is able to accommodate the collar 16 but not the anchoring unit 14 (in either unexpanded or expanded state).

As the coupling mechanism 10 reaches the locating profile 50, the anchoring unit 14 lands on the restriction created by the bottom section 56. This causes the first shear pin 42 to shear. In some embodiments, the shear pin 42 may shear due to the jolt of the assembly landing in the locating profile. Alternatively, the equipment screwed on to the coupling mechanism may include a jarring device, such as a slide hammer, which may be actuated as the assembly lands to impart a jolt sufficient to shear the shear pin 42.

When the shear pin 42 severs, the main body 12 slides downwards into the anchoring unit 14. This action takes place partially under the force of gravity due to the mass of the main body, acoustic transceiver and measuring equipment. However, the severing of the shear pin 42 also releases the spring 18, which applies a counterforce to the anchoring unit 14 via the collar 16. This counterforce assists in providing relative movement between the anchoring unit 14 and the main body 12.

As the main body 12 slides downwards into the anchoring unit 14, the outer surface of the conical portion 24 slides against the inner taper of the anchoring unit 14. This provides a wedging action which urges the anchor slips 40 outwards. The force of this action is sufficient to overcome the retaining force of the snap ring 44, causing the anchoring unit 14 to swell. This causes the anchoring unit 14 to engage with the middle section 54 of the locating profile with a high force.

Figure 6:
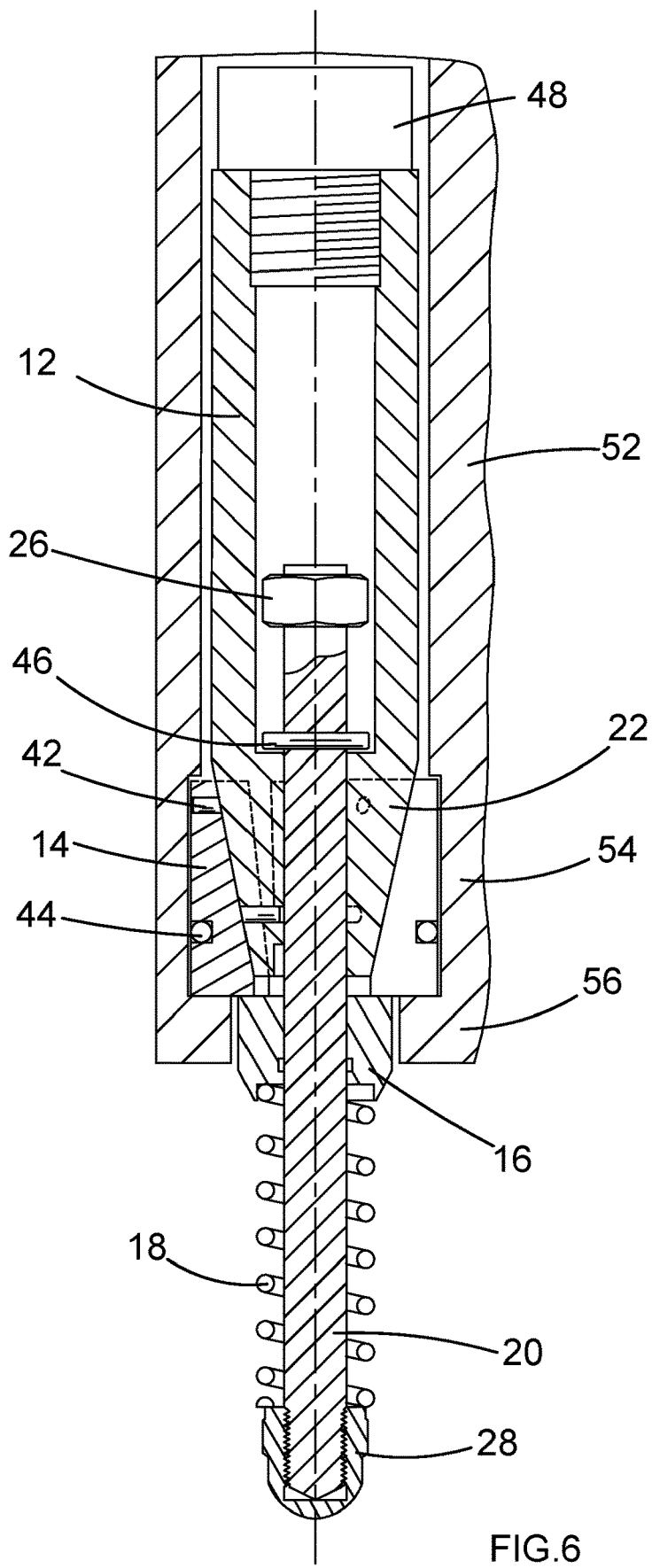
FIG. 6 shows the coupling mechanism after expansion of the anchoring unit.

FIG. 6 shows the coupling mechanism after expansion of the anchoring unit 14 in the locating profile. In this state the sprung snap ring 44 has stretched allowing expansion of the anchoring unit 14 into the middle section 54 of the locating profile. Downward movement of the anchoring unit is prevented by the bottom section 56 of the locating profile. Upward movement of the anchoring unit 14 is prevented by the lip between the middle section 54 and the top section 52 of the locating profile. The compression spring 18 has lengthened but remains in compression. This causes the collar 16 to bear against the lower surface of the anchoring unit 14. This assists the process of driving the anchoring unit 14 along the conical portion 24 of the main body 12 and then keeping it there under force.

When the anchoring unit 14 is in the expanded state, it jams in place in the middle section 54 of the locating profile. The action of the spring 18 in combination with the outward wedging force of the conical portion 24 creates a high force metal to metal contact between the anchoring unit 14 and the wall of the locating profile 50. This is key to the transmission of acoustic energy between the instruments above, through the main body 12, the anchoring unit 14 and into the wellbore tubing (the locating profile). Other instruments at surface or further up or down the well may now communicate with sonic pulses to this assembly. Communication may be in either or both directions.

Figure 7A:
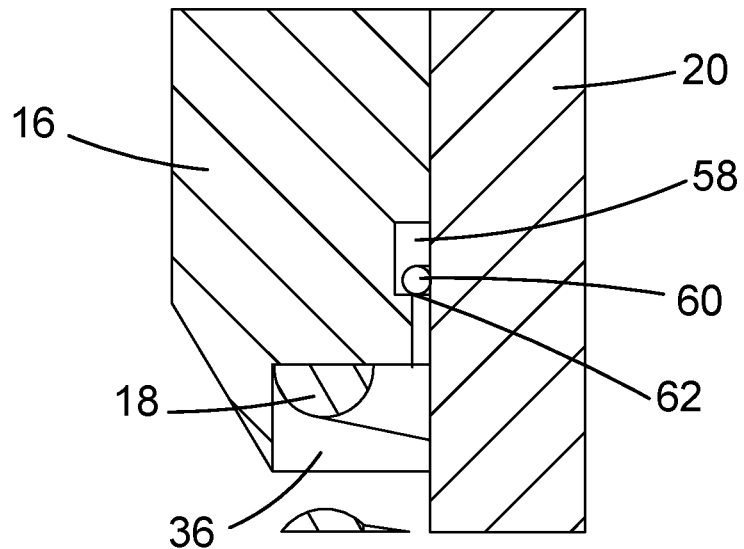
FIGS. 7A and 7B show optional features of a collar.
Figure 7B:
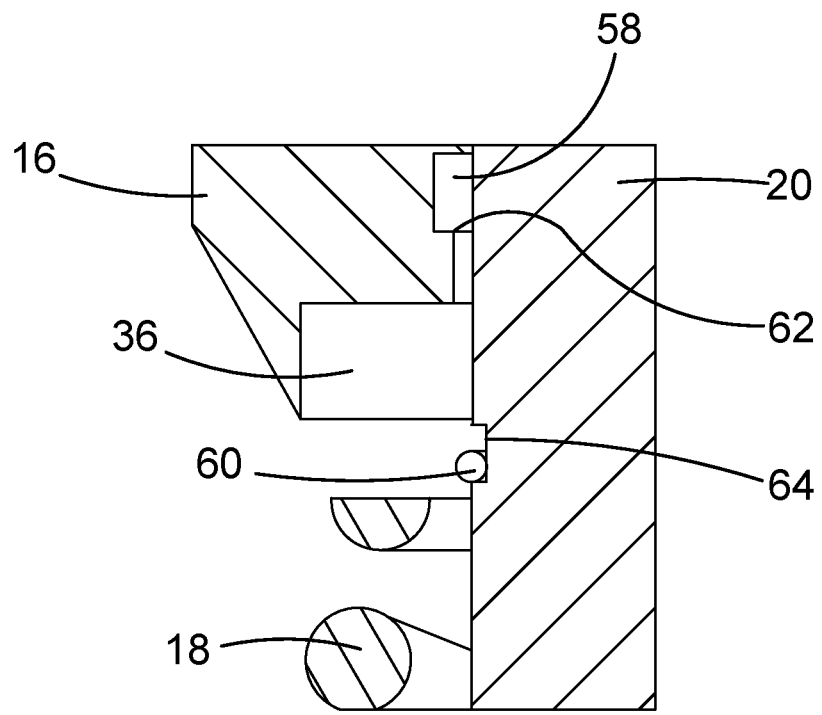

FIGS. 7A and 7B show optional features of the collar 16. In FIG. 7A the anchoring unit 14 is in the unexpanded state. The collar 16 comprises a recess 36 on its end surface, which receives one end of the spring 18. The collar 16 also includes an annular groove 58 on its inner surface, which receives a snap ring 60. In this state the snap ring 60 is under tension (swollen) around the shaft 20. The inner radius of the collar 16 between the groove 58 and the recess 36 is larger than the radius of the shaft 20, but less than the combined radius of the shaft and the snap ring 60. This provides a lip 62 which bears against the snap ring 60 when it is in the swollen state. The lip 62 causes the snap ring 60 to slide along the shaft 20 with the collar 16 as the anchoring unit 14 expands.

FIG. 7B shows a detail of the collar 16 when the anchoring unit 14 is in the expanded state. In this state, the collar 16 has moved axially along the shaft 20 under the force of the spring 18. As the collar 16 moves axially along the shaft, the snap ring 60 encounters an annular groove 64 in the shaft 20. At this point the snap ring 60 snaps into the groove 64. The dimensions of the groove 64 are such that, once the snap ring is in the groove, the lip 62 is able to pass over the snap ring 60. However, downward movement of the collar is prevented by the narrower radius of the collar above the groove 58. Thus the snap ring 60 prevents the collar 16 (and hence the anchoring unit 14) from travelling back in the opposite direction.

However, the coupling mechanism described above may function without requiring a specific mechanism to prevent reverse travel. Thus, in an alternative embodiment, the optional features described with reference to FIGS. 7A and 7B are dispensed with.

Typically the wireline that deployed the assembly is removed by shearing pins above the acoustic transceiver and instruments. The acoustic transceiver and instruments are left in the well hole to record and transmit data.

To retrieve the assembly at a later date, first a wireline is run into the wellbore and engaged with the top of the instruments. Various latching and guide mechanisms are commonly available for this purpose. A jarring device is then used to impart a high shearing force upward on the assembly. This force breaks the second shear pin 46, allowing the main body 12 to slide axially along the shaft 20 until restricted by the nut 26. This leaves the anchoring unit 14 free to collapse under the compressive force of the snap ring 44, thereby allowing the assembly to move upwards beyond the lip of the middle section 54 of the locating profile. The entire assembly can then be drawn upwards through the wellbore.

In the above description, preferred features of the invention have been described with reference to various embodiments. However, it will be appreciated that the invention is not limited to these embodiments, and variations in detail may be made within the scope of the appended claims. For example, rather than using an acoustic communication device, an electromagnetic communication device and/or any other type of wireless communication device could be used as well or instead.

The invention claimed is:

1. A coupling mechanism configured to acoustically couple an acoustic communication device to a locating profile in a wellbore, the coupling mechanism comprising:
    a coupling body arranged for connection to the acoustic communication device, the coupling body comprising a tapered outer surface; and
    an anchoring unit comprising a tapered inner surface arranged to oppose the tapered outer surface of the coupling body,
    wherein the coupling body and the anchoring unit are configured for relative movement to cause the anchoring unit to expand radially to grip the locating profile, so as to allow transmission of acoustic energy between the acoustic communication device and the wellbore, through the coupling body and the anchoring unit, thereby to acoustically couple the acoustic communication device to the wellbore.

2. The coupling mechanism of claim 1, the coupling mechanism further comprising a shaft, wherein at least one of the coupling body or the anchoring unit is arranged to slide axially along the shaft.

3. The coupling mechanism of claim 1, wherein the tapered outer surface of the coupling body is substantially frustoconical.

4. The coupling mechanism of claim 1, wherein the anchoring unit comprises a plurality of anchor slips each of which has a tapered inner surface.

5. The coupling mechanism of claim 4, wherein the anchoring unit comprises a retainer arranged to elastically retain the anchor slips, the retainer is arranged to expand to allow expansion of the anchoring unit in the locating profile, and the retainer is arranged to apply a contracting force to the expanded anchoring unit.

6. The coupling mechanism of claim 1, further comprising a connector arranged to connect the anchoring unit to the coupling body, wherein the connector is arranged to prevent relative movement between the anchoring unit and the coupling body as the coupling mechanism is lowered in the wellbore.

7. The coupling mechanism of claim 6, wherein the connector is arranged to disengage when the coupling mechanism lands in the locating profile.

8. The coupling mechanism of claim 6, wherein the connector comprises a shear pin, and the coupling mechanism is arranged to shear the shear pin as the coupling mechanism lands in the locating profile.

9. The coupling mechanism of claim 1, further comprising a biasing mechanism arranged to bias the anchoring unit against the locating profile.

10. The coupling mechanism of claim 9, wherein the biasing mechanism is arranged to bias the anchoring unit against the locating profile so as to allow the acoustic energy to be transmitted between the acoustic communication device and the wellbore through the coupling body and the anchoring unit.

11. The coupling mechanism of claim 9, wherein the biasing mechanism comprises a spring.

12. The coupling mechanism of claim 11, wherein the coupling mechanism is arranged to hold the spring in compression or tension as the coupling mechanism is lowered in the wellbore and to release the spring when the coupling mechanism lands in the locating profile.

13. The coupling mechanism of claim 12, further comprising a connector arranged to connect the anchoring unit to the coupling body, wherein the connector is arranged to prevent relative movement between the anchoring unit and the coupling body and to hold the spring in compression or tension as the coupling mechanism is lowered in the wellbore.

14. The coupling mechanism of claim 11, the coupling mechanism further comprising a shaft, wherein the spring is located on the shaft.

15. The coupling mechanism of claim 14, further comprising a collar on the shaft between the spring and the anchoring unit.

16. The coupling mechanism of claim 1, further comprising a retainer arranged to retain the coupling body inside the anchoring unit when the anchoring unit has expanded, wherein the retainer is disengagable.

17. The coupling mechanism of claim 16, further comprising a connector arranged to connect the anchoring unit to the coupling body, wherein the connector comprises a first shear pin and the retainer comprises a second shear pin requiring a greater shearing force than the first shear pin.

18. The coupling mechanism of claim 1, wherein the locating profile comprises:
    a first section with an inner radius sufficiently large to allow passage of the coupling mechanism in an unexpanded state but not in an expanded state;
    a second section with an inner radius greater than that of the first section; and
    a third section with an inner radius less than that of the first section and the second section.

19. A method of acoustically coupling an acoustic communication device to a locating profile in a wellbore, the method comprising:
    connecting the acoustic communication device to a coupling mechanism, the coupling mechanism comprising a coupling body and an anchoring unit, the coupling body comprising a tapered outer surface and the anchoring unit comprising a tapered inner surface arranged to oppose the tapered outer surface of the coupling body;

lowering the coupling mechanism and the acoustic communication device into the wellbore; and moving the coupling body relative to the anchoring unit to cause the anchoring unit to expand radially to grip the locating profile, so as to allow transmission of acoustic energy between the acoustic communication device and the wellbore, through the coupling body and the anchoring unit, thereby to acoustically couple the acoustic communication device to the wellbore.

20. An assembly comprising:

an acoustic communication device configured to transmit acoustic communication signals; and a coupling mechanism configured to acoustically couple the acoustic communication device to a locating profile in a wellbore, the coupling mechanism comprising:

a coupling body connected to the acoustic communication device, the coupling body comprising a tapered outer surface; and an anchoring unit comprising a tapered inner surface arranged to oppose the tapered outer surface of the coupling body, wherein the coupling body and the anchoring unit are configured for relative movement to cause the anchoring unit to expand radially to grip the locating profile, so as to allow transmission of acoustic energy between the acoustic communication device and the wellbore, through the coupling body and the anchoring unit, thereby to acoustically couple the acoustic communication device to the wellbore.

* * * * *